…

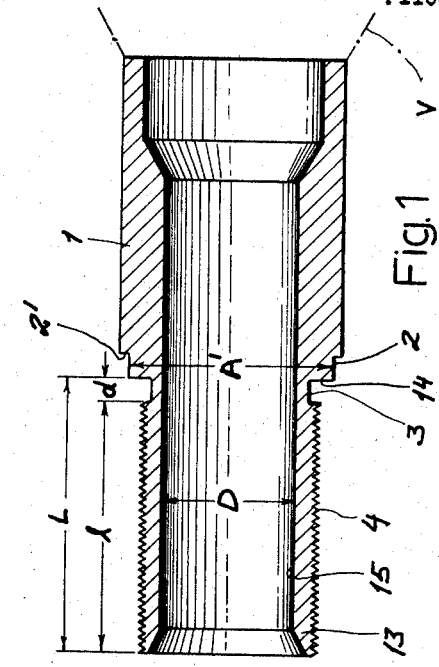
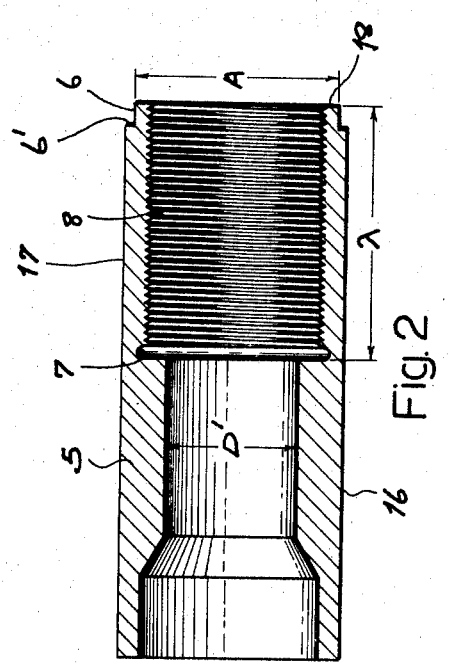
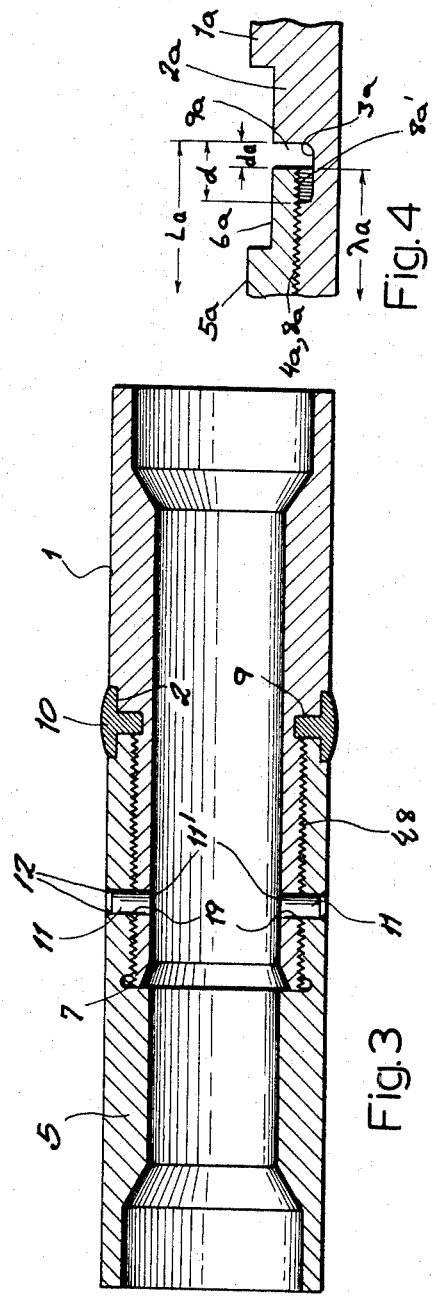

United States Patent Office 3,415,546
Patented Dec. 10, 1968

3,415,546
PIPE CONNECTORS
Erwin Rubner, Munich, and Siegfried Hausotter, Tacherting, Germany, assignors to Linde Aktiengesellschaft, Wiesbaden, Germany, a corporation of Germany
Filed Jan. 20, 1967, Ser. No. 615,291
Claims priority, application Germany, Feb. 4, 1966, L 52,773
7 Claims. (Cl. 285—173)

ABSTRACT OF THE DISCLOSURE

A pipe connector for the gas and vacuum tight coupling of aluminum and austentic steel (stainless steel) pipe members, which are difficult to join mechanically by welding, wherein a male coupling member of one of these metals and a female coupling member of the other metal are matingly screwed together and fixed against relative angular movement by radial pins transfixing both members at their mating thread portions welded externally in a fluid-tight manner to the female coupling member; the male coupling member has a shoulder at the end of its thread defining with the juxtaposed end of the female coupling member an outwardly open circumferential groove at the transition region of both coupling members, filled with a weldment or bead of weld material sealing the members together.

---

Our present invention relates to a pipe connector for joining tubular elements composed of different metals which are usually connectable directly only with difficulty and in a problematic manner.

The connection of tubular members (e.g. an aluminum pipe with a stainless-steel or austenitic-steel vessel through which the aluminum pipe extends, the interconnection of aluminum pipe with an austenitic-steel pipe, or the sealing connection of an austenitic-steel pipe to an aluminum vessel) has hitherto involved many difficulties because of different physical characteristics of the metals. It has been discovered, for example, that simple welds between the two metals are difficult to accomplish and, when subjected to mechanical or thermal stress, are readily ruptured. Consequently, whenever it has been desired to connect tubular members of these metals together, it has been necessary to resort to bolted flanges, auxiliary sealing members or the like to resist mechanical stress and prevent leakage of the joint.

The connection of members of these metals has been found to be especially important in low-temperature or cryogenic installations. Such installations include gas-rectification, air separation, liquified-gas storage and similar plants in which low-boiling-point gases (e.g. nitrogen) may be produced or stored. Such installations also include plants using low-boiling-point gases for research and industry.

In such installations, it is important to provide vessels which are not corrodible and which can withstand the mechanical stresses of substantial pressures. These materials must have the ability of being tightly sealed even over wide temperature ranges and must be capable of withstanding extremely low temperatures (e.g. ranging below −60° C.) and thermal shocks. At these temperatures, rubber seals and like sealing elements are useless.

As a practical matter, it is common in such installations to provide a liquified-gas tank of the double-wall type in which an evacuated compartment is provided between the inner vessel and the outer vessel. This compartment is frequently filled with thermal installation while pipes pass from the inner vessel through the evacuated compartment and emerge from the outer vessel. Such pipes should have a relatively low thermal conductivity, and austenitic steel such as 18–8 chromium-nickel alloy stainless steels have been commonly used for this purpose. As long as the inner vessel consists of a like material, no difficulties are encountered in joining the pipe to the vessel or in forming a seal therebetween. It is, however, desirable to provide an aluminum or aluminum/magnesium alloy as the material for the inner vessel. It is therefore important to provide an effective and economical manner of sealingly connecting the austenitic-steel pipe to such a vessel.

The principal object of the present invention is to provide an improved method coupling for joining tubular austenitic-steel and aluminum members together in a gas-tight connection.

Still another object of this invention is to provide an improved coupling enabling an austenitic tube to be sealingly joined to an aluminum vessel of the type described.

These objects and others which will become apparent hereinafter are attained, in accordance with the present invention, with the aid of a tubular coupling comprising a male coupling member and a female coupling member of the different metals, the coupling members being provided with respective screw threads for matingly joining the male and female portions. The male member is, moreover, formed with an annualar step or shoulder confronting the end of the female member so as to define between this shoulder and the end face of the female member a circumferential groove in which a weldment is disposed to seal the junction of the members and bond them one to the other. In effect, therefore, it is the combination of the tightly screwed threaded coupling with the annular bead sealingly joining the two members that constitutes an essential element of this invention. According to a specific feature of this invention, the male member is formed, in the region between this shoulder and its threaded part, with a circumferential recess extending somewhat below the roots of the thread and in alignment with the circumferential groove so that this recess is also filled with the weldment. When the female member projects beyond the wall of this recess and overhangs the latter, it will form a clearance into which the weldment can flow and engage with the thread portion in this region to further lock the members against relative rotation and axial stress.

The coupling member formed in this manner serves to join an aluminum tubular part with a steel part formed from stainless austenitic steel and capable of withstanding vacuums of extreme degree. Furthermore, the coupling resists severe mechanical stress and is relatively simple and inexpensive to construct. By providing the wall seal at the outer joining, i.e. at the end of the male thread and at the forward end of the female thread, any gases in emerging from the interior of the coupling must pass through the sharply constricted clearance formed along the threads and thus suffer a severe pressure drop across the threaded part even in the asbsence of the weldment. The weld is only required to withstand the mechanical stress resulting from the residual pressure of the gas after the pressure drop across the constricted thread clearance is considered.

According to another feature of this invention, the outer diameter of the female member and the outer diameter of the male member rearwardly of its threaded portions are substantially identical so that the diameter of the male member corresponds substantially to the inner diameter of the female member. Furthermore, the juxtaposed shoulders of the male member and the end face of the female member are preferably set so that the groove formed therebetween has a relatively narrow inner gap, preferably aligned with the aforementioned recess of the male member and a wider outer portion, the groove thus having a T-shaped cross-section. Furthermore, at least one and preferably a plurality of pins are inserted radially from the exterior through respective radial bores drilled in the threadedly interconnected male and female portions, these pins terminating at the inner surface of the male member and flush with the outer surface of the female member. A weld seam annularly joins each pin to the outer member for sealing the system. The pins thus resist shear when torques are applied to the connected members.

According to a further feature of this invention the male thread is provided upon an axially extending threaded portion which is somewhat longer than the threaded portion of the female member so that an annular clearance is provided between the front extremity of the female member and the shoulder at which the threaded male portion is joined to the remainder of the male member. Advantageously, this greater length of the male portion is equal to the diameter or width of the circumferential recess formed in the male member or is less than this diameter so that the female member will overhang the weldment of this recess.

The present invention thus includes pipe connectors in which the outer tubular member is composed of austenitic or stainless steel and the inner coupling member is composed of aluminum or aluminum alloys. It is however, also contemplated to reverse this and provide a female member of aluminum and a male member of stainless steel. This latter arrangement wherein the aluminum body is the female member, has the advantage that the larger coefficient of thermal expansion of the aluminum, upon cooling, causes the aluminum to shrink to a greater extent and seize the male member more firmly, thereby increasing the sealing and tightness of the joint. In this circumstance the radial pins will generally be composed of aluminum and thus be relatively soft so that the coupling may not be completely satisfactory for the more severe torsional stresses. When such stresses are involved, steel pins and a steel female member are preferred. In general, the aluminum member may be welded by conventional techniques to an aluminum vessel of the type used at the inner compartment for a double-wall cryogenic installation.

Other objects, features and advantages of the present invention will become more readily apparent from the following description, reference being made to the accompanying drawings in which:

FIGS. 1 and 2 are axial cross-sectional views through the male and female members of a pipe coupling according to this invention;

FIG. 3 is an axial cross-sectional view of the assembled pipe coupling; and

FIG. 4 is a detailed view drawn on an enlarged scale illustrating a modification of this invention.

In FIG. 1, I show the male member of a pipe coupling which is here composed of aluminum but may, as noted earlier, be formed from the austenitic stainless steel when the compositions of the pipe members are interchanged. The male pipe member comprises a cylindrical body 1 having at its left-hand extremity a projecting portion or shank 13 which is threaded and will be referred to hereinafter as the threaded shank or projecting portion. The length of this shank is represented as L and it can be seen that the shank has a male thread 4 of an effective length *l* which is less than the overall length L of the shank by a distance *d*. This distance *d* corresponds, generally speaking, to the diameter or width, in section, of a rounded recess 3 extending circumferentially about the male member 1 at the junction between the threaded shank 13 and the body 1 of the male member. The recess 3 lies below the root of the thread 4 and is flanked by a shoulder 14 perpendicular to the axis of the male member and extending outwardly beyond the crests of the thread 4 which terminates at an annular step 2. The inner bore 15 of the male portion has a diameter D corresponding substantially to the diameter D' of the inner bore of the body 16 of the female member 5 (FIG. 2).

The female member 5 includes, in addition to this means or body portion 16, a threaded sleeve 17 whose internal or female thread 8 matingly engages the male thread 4 of the male member. At its forward end, i.e. axially inwardly with respect to the completed or assembled coupling, the female member 5, which is composed of an austenitic steel (e.g. chromium-nickel stainless steel) is provided with a step 6 whose diameter A is equal to the diameter A' of the steps 2 of the male member. At its right-hand end, moreover, below the step 6, the female member is formed with a transverse face 18 which is parallel to the face 14 of the male member. The threaded sleeve 17 of the female member has an axial length λ equal substantially to the length *l* of the thread on the shank; the total length L of the threaded portion is substantially greater than the length λ of the threaded part of the female member by the distance *d* corresponding to the width of the recess. Behind the thread 8, a groove 7 is sunk into the female member.

The male and female members of FIGS. 1 and 2 are assembled by threading them tightly together until the faces 14 and 18 define a circumferential groove readily aligned with the recess 3 and with a widened groove portion defined between the steps 2 and 6 and their respective walls 2' and 6'. Thus, a general T-section slot is formed exteriorly of the coupling at the junction of the male member and the female member. This slot 9 is filled with a weldment 10 of aluminum, i.e. a material corresponding to that of, or comparable with, the material constituting the male member.

Inasmuch as the weld bead is disposed almost entirely in the groove 9, the weld seam does not lie significantly above the substantially continuous outer surface of the two members whose body portions 1 and 5 have the same diameter. The weldment is anchored by the groove and prevents separation of the threaded part while forming a seal between them. Thereafter, a pair of radial bores 19 are drilled at diagonally opposite locations radially through both coupling members, and shear-resisting pins 11 are inserted. These pins have axial lengths no greater than the combined thickness of the threadedly connected portions so that their inner faces 11' lie flush with the inner surfaces of the connector. Along the outer or female member 5 the pins 11 are fixed by circumferential welds 12 all around the pins 11. The pins resist relative torsional stress.

In the embodiment of FIG. 4, the male member 1a has a threaded-shank length La which is greater than the threaded-sleeve length λa by a distance da amounting to only a third of the width *d* of the recess 3a. Thus the forward end of the female member 5a overhangs the floor of the recess 3a and the weldment filling the groove 9a also passes beneath this overhang and is anchored more firmly at the junction of these pipe members. The seal and mechanical bond is increased further by the fact that the weldment also fills the roots of the threaded portion 8a' of the overhang.

EXAMPLE

A pipe coupling of the type illustrated in FIGS. 1–3 is assembled from an aluminum male member 1 composed of the aluminum/magnesium alloy AlMg$_3$/5154 F 18 and a steel female member 5 composed of 18–8 chromium nickel alloy steel or the stainless steel alloy X 10 CrNiTi 189. The steel female member 5 is pickled in the region of its step 6 and thereafter tinned with tinol. The coupling members are then screwed together and drilled at 19. Pins 11 of steel are inserted and welded in place by conventional austenitic steel welding along the seam 12. Using nonconsumable electric-arc-welding electrodes and a weldment rod of S-AlSi 12 aluminum, the bead 10 was deposited. At the end of the female member 5, a steel pipe was welded by conventional techniques while an aluminum pipe was welded to the male member 1 by heliarc-welding. The resulting assembly was gas-tight, resistant to mechanical stress and has no tendency to leakage even when subjected to substantial thermal shock. The tests included, for an assembly with an outer diameter of 35 mm., the following:

(1) Gas tightness

The interior of the assembly was subjected to a vacuum of $10^{-5}$ torr. The assembly was then immersed ten times in liquid nitrogen (at $-196°$ C.) and after each such immersion rapidly heated to a temperature of $+150°$ C. When the assembly was tested with helium, no leakage was observed. The test showed that there was no leakage under thermal stress between $-196°$ C. and $+150°$ C. within the limits of sensitivity of the test (i.e. $5 \times 10^{-10}$ torr. $\times$ liters/second).

(2) Torsion stress

The assembly was subjected with a conventional torque key to rotational stress in the sense of loosening of the treated connection. The seal was broken upon the application of a torque of 210 kg.$\times$meters.

(3) Longitudinal stress

The assembly was subjected to tensional stress and the seal was found to fail in the region of the seam at a stress of 8760 kg.

The assembly was found to be mechanically and thermally stable when emplaced in a cryogenic installation as described earlier by welding an aluminum vessel V to the aluminum member 1 and attaching a pipe to the female member 5.

The invention described and illustrated is believed to admit of many modifications within the ability of persons skilled in the art, all such modifications being considered within the spirit and scope of the appended claims.

We claim:

1. A pipe connector assembly for the gas-tight mechanical connection of pipes of different materials, comprising a male pipe member and a female pipe member provided respectively with male and female threaded portions matingly interengageable to join said members, said members defining between them an outwardly open circumferential groove; a bead of a weldment in said groove and bonded to said members, one of said members being composed of aluminum or an aluminum alloy and the other of said members being composed of an austenitic steel; and at least one radial pin transfixing said members at their threadedly interconnected portions and extending inwardly from the outer surface of said female member; and a circular weld seam sealingly securing said pin to said female member.

2. A pipe-connector assembly for the gas-tight mechanical connection of pipes of different materials, comprising a male pipe member and a female pipe member provided respectively with male and female threaded portions matingly interengageable to join said members, said members defining between them an outwardly open circumferential groove; a bead of a weldment in said groove and bonded to said members, one of said members being composed of aluminum or an aluminum alloy and the other of said members being composed of an austenitic steel, said male member including a body of relatively large diameter and a threaded shank of smaller diameter integral with said body and received in said female member, said female member having an outer diameter substantially equal to that of said body, said male member being formed at the junction of said body and said male portion with an annular step and said female member being provided at the end thereof confronting said body with an annular step of a diameter substantially equal to that of said step of said male member, said steps defining between them said groove, said groove having a generally rectangular cross-section, the threaded length of said female member being less than the length of said threaded portion of said male member and said members being provided with means limiting the threaded insertion of the male member into the female member to form a gap between the end of said female member and said body portion in radial alignment with the annular groove formed by said steps in the interconnected condition of said members.

3. An assembly as defined in claim 2 wherein said male member is further formed with an outwardly open circumferential recess in the threaded portion thereof at its junction with said body, said recess being aligned with said gap and said groove, the difference in length of said threaded portion of said male member and the threaded portion of said female member being equal substantially to the axial width of said recess.

4. An assembly as defined in claim 2 wherein said male member is further formed with an outwardly open circumferential recess in the threaded portion thereof at its junction with said body, said recess being aligned with said gap and said groove, the length of the threaded portion of said female member being less than the length of said threaded portion of the male member by a distance less than the width of said recess whereby said threaded portion of said female member partly overhangs said recess, said weldment extending beneath the overhanging part of said threaded portion of said female member and engaging in the threads thereof.

5. A pipe-connector assembly for the gas-tight mechanical connection of pipes of different materials, comprising a male pipe member and a female pipe member provided respectively with male and female threaded portions matingly interengageable to join said members, said members defining between them an outwardly open circumferential groove, a bead of a weldment in said groove and bonded to said members; one of said members being composed of aluminum or an aluminum alloy and the other of said members being composed of an austenitic steel, said male member including a body of relatively large diameter and a threaded shank of smaller diameter integral with said body and received in said female member, said female member having an outer diameter substantially equal to that of said body, said male member being formed at the junction of said body and said male portion with an annular step and said female member being provided at the end thereof confronting said body with an annular step of a diameter substantially equal to that of said step of said male member, said steps defining between them said groove, said groove having a generally rectangular cross-section, the threaded length of said female member being less than the length of said threaded portion of said male member and said members being provided with means limiting the threaded insertion of the male member into the female member to form a gap between the end of said female member and said body portion in radial alignment with the annular groove formed by said steps in the interconnected condition of said members, said male member being further formed with an outwardly open circumferential recess in said threaded portion thereof at the junction thereof with said body, said recess being aligned with said gap and said groove.

6. An assembly as defined in claim 5 wherein the difference in length of said threaded portion of said male member and the threaded portion of said female member is equal substantially to the axial width of said recess.

7. An assembly as defined in claim 5 wherein said length of the threaded portion of said female member is less than the length of said threaded portion of the male member by a distance less than the width of said recess and said threaded portion of said female member partly overhangs said recess, said weldment extending beneath the overhanging part of said female member and engaging in the threads thereof.

References Cited

UNITED STATES PATENTS

| | | | |
|---|---|---|---|
| 1,344,221 | 6/1920 | Burns | 285—286 |
| 2,153,494 | 4/1939 | Arutunoff | 285—287 X |
| 2,206,166 | 7/1940 | Dunn | 285—390 X |
| 2,769,318 | 11/1956 | Grenell | 285—173 X |
| 3,163,449 | 12/1964 | Westfall | 285—286 X |
| 3,335,799 | 8/1967 | Miller. | |
| 2,258,066 | 10/1941 | Oyen | 285—390 |

FOREIGN PATENTS

| | | |
|---|---|---|
| 367,186 | 1/1923 | Germany. |
| 544,656 | 6/1922 | France. |

CARL W. TOMLIN, *Primary Examiner.*

ANDREW KUNDRAT, *Assistant Examiner.*

U.S. Cl. X.R.

285—286, 329, 355